June 16, 1925.                                                                    1,542,509
A. KUENY
VACUUM FEED DEVICE
Filed Aug. 6, 1924                       2 Sheets-Sheet 1

Inventor
Albert Kueny,
By
Attorney

June 16, 1925.

A. KUENY

VACUUM FEED DEVICE

Filed Aug. 6, 1924

1,542,509

2 Sheets-Sheet 2

Inventor
Albert Kueny,

By

Attorney

Patented June 16, 1925. 1,542,509

UNITED STATES PATENT OFFICE.

ALBERT KUENY, OF DANBURY, IOWA.

VACUUM-FEED DEVICE.

Application filed August 6, 1924. Serial No. 730,486.

*To all whom it may concern:*

Be it known that I, ALBERT KUENY, a citizen of the United States, residing at Danbury, in the county of Woodbury and State of Iowa, have invented certain new and useful Improvements in Vacuum-Feed Devices, of which the following is a specification.

My invention relates to improvements in vacuum feed tanks, for use upon automobiles, for supplying the float chamber of the carburetor with liquid fuel, withdrawn from a tank arranged at a point remote from the carburetor.

An important object of the invention is to provide a device of the above mentioned character, which is extremely simple in construction, cheap to manufacture, and reliable in operation.

Other objects and advantages of the invention will be apparent during the course of the following description.

Figure 1:
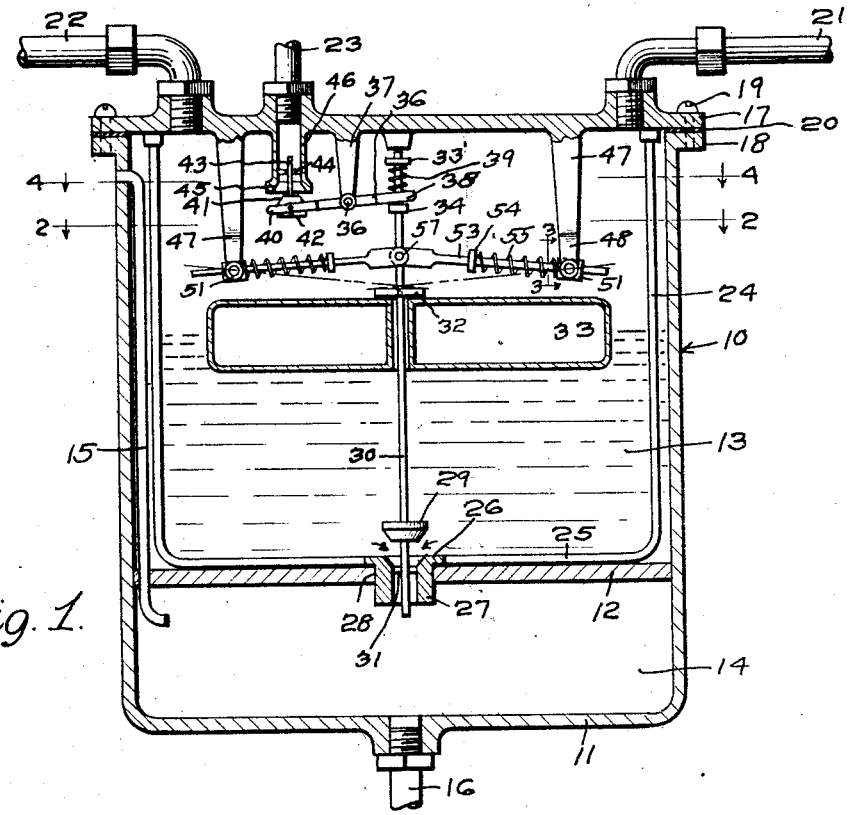
Figure 2:
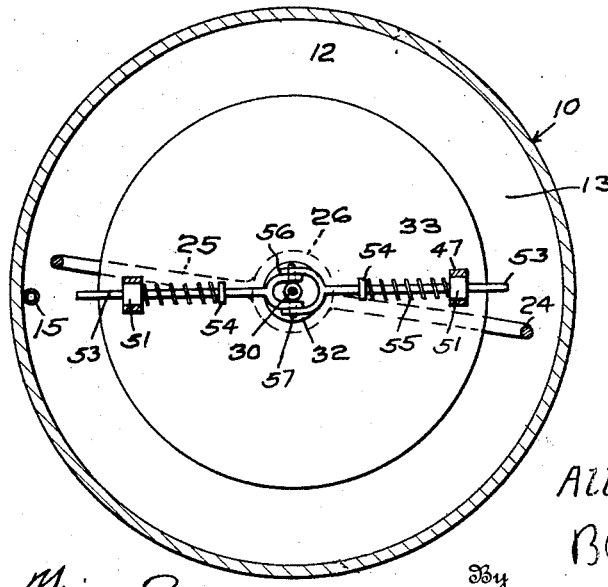
Figure 3:
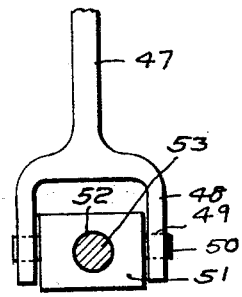
Figure 4:
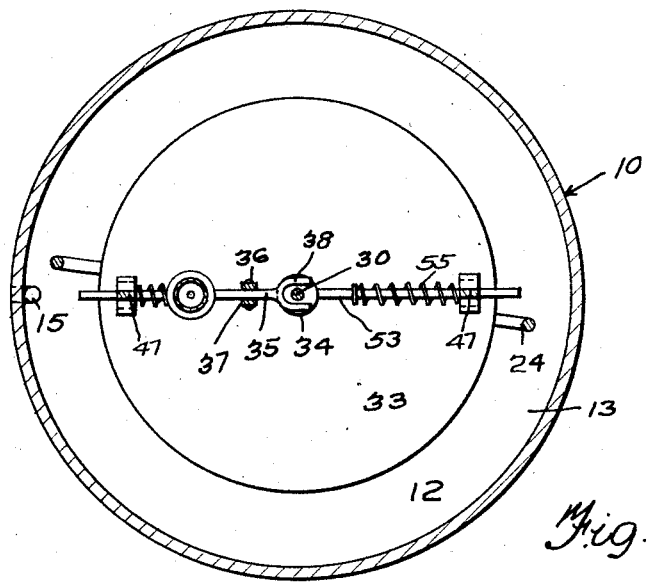
Figure 5:
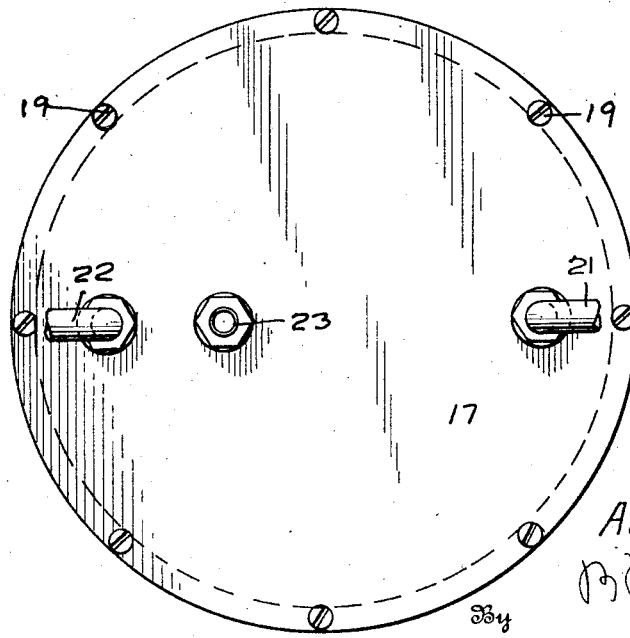

In the accompanying drawings forming a part of this specification, and in which like numerals are employed to designate like parts throughout the same, Figure 1 is a central vertical section through a device embodying my invention, Figure 2 is a horizontal section taken on line 2—2 of Figure 1, Figure 3 is a detail section taken on line 3—3 of Figure 1, Figure 4 is a horizontal section taken on line 4—4 of Figure 1, and, Figure 5 is a plan view of the same.

In the drawings, wherein for the purpose of illustration is shown a preferred embodiment of my invention the numeral 10 designates a tank, having a bottom 11, and a false bottom 12, which has an air tight fit with the tank. This false bottom divides the tank into an upper feeding or filling chamber 13 and a lower discharge chamber 14, as shown. The numeral 15 designates an air pipe, passing through an opening in the false bottom 12, and having an air tight fit within this opening, and discharging into the discharge chamber 14. The upper end of this pipe leads to the atmosphere, exteriorly of the filling chamber 13, as shown. Leading into the discharge chamber 14 is a pipe 16, which discharges into the float chamber of the carburetor. The tank 10 is arranged near the carburetor and above the same, so that gasoline within the chamber 14 will feed by gravity into the float chamber of the carburetor, through the pipe 16.

The numeral 17 designates a cover or top, adapted to be secured to a flange 18, formed upon the tank 10, by bolts 19 or the like, with suitable packing 20, between these parts, for effecting an air tight joint. Leading into the cover 17 is a gasoline supply pipe 21, which extends to the main tank, generally at the rear of the automobile. A vacuum or suction pipe 22, leads through the top 17 into the top of the chamber 13, and this pipe is connected with the manifold or suction of the engine. The top 17 carries an air pipe 23, leading at its upper end to the atmosphere, and discharging into the top of the chamber 13, as shown.

Rigidly secured to the top 17 and depending therefrom is a U-shaped rod or bracket 24, having its transverse portion 25, equipped with an annular valve seat 26, carrying a depending tubular extension 27, passing through an opening 28 in the false bottom 12, and having an air tight fit therein. The valve seat 26 is adapted to be engaged and disengaged by a valve 29, arranged above the same, and rigidly mounted upon a reciprocatory valve rod 30, the lower end of which is guided in a spider 31, within the tubular neck 27, but this spider does not prevent the proper discharge of the gasoline or liquid from the receiving chamber 13 into the discharge chamber 14, when the valve 29 is unseated. A stop ring 32 is rigidly mounted upon the upper portion of the valve rod 30, and a float 33 is slidable upon the rod 30, between the stop ring 32 and the valve 29, and is adapted to alternately contact therewith.

The valve rod 30 is provided at its extreme upper end with a collar 33, rigidly attached thereto, and also with a collar 34, spaced from the collar 33. A vertically swinging lever 35, is pivoted at 36, to a stationary arm 37. This lever has its forked end 38 straddling the rod 30, between the collars 33 and 34, and engaging beneath a compressible coil spring 39, as shown. The opposite end of the lever 35, is forked, as shown at 40, and this forked end straddles a valve 41, and is pivoted thereto at 42. This valve carries a stem 43 slidable in a spider 44. When the valve 42 is shifted to the raised position it engages a valve seat 45, formed upon the lower end of a coupling 46, receiving the pipe 23. When the valve 41 is seated, the tubular coupling 46 is closed, and air cannot be admitted into the receiving chamber 13.

Depending from the top or cover 17 are vertical arms or brackets 47, rigidly secured thereto, and these arms have their lower ends forked, as shown at 48. These forked ends have openings 49, pivotally receiving trunnions 50, rigidly secured to blocks 51. These blocks have openings 52, slidably receiving locking rods 53. These locking rods are provided with collars 54, upon their inner portions, which are rigidly secured thereto, and compressible coil springs 55, are confined between these collars and the blocks 51. The inner ends of the locking rods 53 are forked, as indicated at 56, in Figure 2, and these forked ends are apertured for pivotally receiving a pin 57, passing through an opening in the valve rod 30. It might be stated at this point that when the valve rod 30 is in the uppermost position, the locking rods 53 are swung upwardly past dead center, or above their pivots 50, and when the rod 30 is shifted to the lowermost position, the inner ends of these locking rods move downwardly below dead center or their pivots 50. These rods therefore serve to lock or hold the rod 30 in the shifted position, in either direction, until removed therefrom, by means of the float.

The operation of the device is as follows:

With the parts in the position as shown in Figure 1, the filling operation has just been completed. The level of the gasoline within the chamber 13 has reached the maximum, and the float 33 has been elevated, carrying upwardly the rod 30. This rod has shifted the locking rods 53 upwardly past dead center, and the rod 30 is locked in the upper position. The valve 41 and valve 29 are now held open. When the valve 41 opens, the vacuum is broken within the filling chamber 13, as pipe 23 places this chamber in communication with the atmosphere. Hence the supply of gasoline into the chamber 13 stops. The valve 29 being open, the gasoline will now feed into the discharge chamber 14, and hence to the float chamber of the carburetor. When the level of the gasoline within the chamber 13 reaches a sufficiently low point, the float 33 will descend sufficiently to contact with the valve 29, and move the rod 30 downwardly, thereby closing valve 29 and valve 41. The suction from the pipe 22 now creates a partial vacuum within the feed chamber 13, and gasoline is supplied into this chamber through the pipe 21, until the float 33 again assumes the elevated position, to lift the rod 30, and break the vacuum within the chamber 13.

It is to be understood that the form of my invention herewith shown and described is to be taken as a preferred embodiment of the same, and that various changes in the shape, size, and arrangement of parts, may be resorted to, without departing from the spirit of my invention, or the scope of the subjoined claims.

Having thus described my invention, I claim:

1. A vacuum feed device comprising, a tank having separate receiving and discharge chambers, an outlet pipe connected with the discharge chamber to lead to the float chamber of a carburetor, a liquid fuel supply pipe leading into the receiving chamber, a suction pipe leading into the receiving chamber and adapted for connection with the suction side of an internal combustion engine, an air inlet leading into the receiving chamber, a valve controlling communication between the receiving chamber and the discharge chamber, a valve to cover and uncover the air inlet, a substantially vertical rod carrying the first named valve and arranged within the receiving chamber, a float mounted upon the substantially vertical rod to move longitudinally thereof and adapted to contact with the valve carried by the rod to shift the rod downwardly, a stop mounted upon the rod and to engage with the float when the same reaches the end of its upward travel whereby the float shifts the rod upwardly, means whereby the second named valve is shifted by the movement of the rod, supports arranged within the receiving chamber and attached to a part thereof and being free from connection with the float, locking rods pivotally connected at their inner ends with the valve rod and slidably engaging the supports, and yielding means to oppose the swinging movement of the locking rods and serving to hold the same in positions above or below dead center when shifted thereto.

2. A vacuum feed device comprising, a tank having a receiving chamber, an outlet valve for the receiving chamber, means to receive the liquid fuel from the receiving chamber and supply the same to the float chamber of a carburetor, a substantially vertical rod connected with the outlet valve and extending within the receiving chamber, a float mounted upon the rod to move longitudinally thereof, said float being adapted to shift the rod longitudinally when moved to the uppermost or lowermost positions, a liquid fuel supply pipe leading into the receiving chamber, a suction pipe leading into the receiving chamber and adapted for connection with the suction side of an internal combustion engine, an air inlet leading into the receiving chamber, a control valve for the air inlet, means whereby the controlled valve is shifted by the movement of said rod, relatively stationary supports mounted within the receiving chamber and attached to parts thereof, locking rods pivotally and slidably connected with the supports near their outer ends and having their inner ends pivotally connected with the valve rod, and springs to oppose the longitudinal movement of the locking rods, said springs serving to hold the locking rods in the lower or upper positions past dead center.

3. A vacuum feed device comprising, a tank having a receiving chamber, an outlet valve for the receiving chamber, a substantially vertical rod connected with the outlet valve and extending into the receiving chamber, means for receiving the liquid fuel from the receiving chamber and to supply the same to the float chamber of a carburetor, a float mounted upon the substantially vertical valve rod to move longitudinally thereof and adapted to shift the valve rod longitudinally when moved to the end of its travel in either direction, a liquid fuel supply pipe leading into the receiving chamber, a suction pipe leading to the receiving chamber and adapted for connection with the suction side of an internal combustion engine, an air inlet leading into the receiving chamber, a control valve for the air inlet, means whereby the control valve is shifted by the movement of the valve rod, a pair of stationary arms rigidly attached to the top of the receiving chamber and depending therefrom, blocks pivotally mounted upon the arms to swing vertically and having openings, locking rods having their ends slidable within the openings of said blocks, compressible coil springs surrounding the locking rods and engaging the blocks to oppose the longitudinal movement of said locking rods and to hold the locking rods in a lower or upper position when shifted thereto past dead center, and means for pivotally connecting the inner ends of locking rods with the valve rod.

4. A vacuum feed device comprising, a tank having a receiving chamber, a tubular outlet for the chamber having a spider, a substantially vertical valve rod arranged within the receiving chamber and having its lower end guided within the spider, an outlet valve secured upon the valve rod to cover and uncover the tubular outlet, means receiving the liquid fuel from the tubular outlet and adapted to supply the same to the float chamber of a carburetor, a liquid fuel supply pipe leading into the receiving chamber, a suction pipe leading into the receiving chamber, and adapted for connecting with the suction side of an internal combustion engine, an air inlet leading into the receiving chamber, a control valve for the air inlet, a pivoted lever connected with the control valve and connected with the substantially vertical valve rod, a float mounted to move longitudinally upon the valve rod and adapted to shift the valve rod when the float moves to the end of its travel in either direction, stationary arms arranged within the receiving chamber above the float, blocks pivoted upon the arms to swing vertically and having openings, locking rods having their outer ends slidable within the openings, of the blocks and having their inner ends pivotally connected with the valve rod, stops carried by the locking rods, and compressible coil springs surrounding the locking rods and held between the stops and the blocks.

In testimony whereof I affix my signature.

ALBERT KUENY.